Patented Mar. 28, 1944

2,345,109

UNITED STATES PATENT OFFICE 2,345,109

PROCESS FOR MANUFACTURE OF THIOUREA CONDENSATION PRODUCTS

Charles Graenacher, Riehen, Richard Sallmann, Bottmingen, and Otto Albrecht, Basel, Switzerland, assignors to the firm of Society of Chemical Industry in Basle, Basel, Switzerland No Drawing. Application January 19, 1939, Serial No. 251,848. In Switzerland January 22, 1938

8 Claims. (Cl. 260—402.5)

According to the present invention new condensation products are obtained by reacting a thiourea compound containing the group

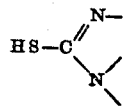

with a formaldehyde derivative of a compound of the general formula

R—X—H wherein R stands for an organic radical containing at least 13 carbon atoms, X stands for a bridge consisting of the group

and of at least one and at the most two elements with an atomic weight between 14 and 16 directly connected with the group

and wherein H is bound to an element having an atomic weight between 14 and 16.

As thiourea compound containing the group

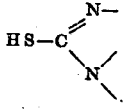

may be used thiourea, N-methyl-, N:N'-dimethyl-, N:N:N'-trimethylthiourea, N-monoethylthiourea, N-phenylthiourea, N:N'-diethylthiourea, potassium N-phenylthiourea-parasulfonate, sym.-diethyloxythiourea (C₂H₅—NH—CS—N(C₂H₅)OH)

monothiobiuret (NH₂—CO—NH—CS—NH₂), thioallophanic acid methyl ester

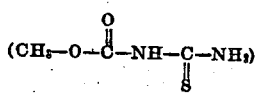

or the like.

Quite generally may be used thiourea compounds of the formula

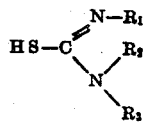

wherein R₁, R₂ and R₃ represent alkyl, aryl, aralkyl radicals, substituted alkyl radicals or alkyl radicals interrupted by other atoms such as O, S, N, or substituted aryl radicals. These products of the indicated formula

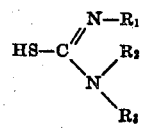

are also designated as "pseudo-thioureas." A radical such as

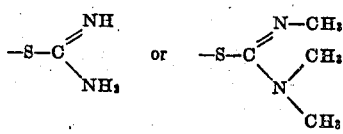

is therefore designated in the present specification as "a radical of a pseudo-thiourea compound."

As an example of a compound of the above mentioned general formula

R—X—H wherein R stands for an organic radical containing at least 13 carbon atoms and X represents a bridge consisting of the group

and of at least 1 and at the most two elements having an atomic weight between 14 and 16 directly connected with the group

there may be mentioned the stearic acid amide of the formula

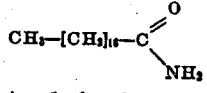

In this case R stands for $CH_3$—$[CH_2]_{16}$—, and X stands for

In the bridge X the

group can also be linked to oxygen (atomic weight=16) besides to nitrogen (atomic weight=14). Such an example is the stearic acid of the formula

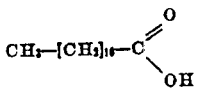

wherein the group

stands for the bridge X in the general formula

R—X—H

Examples of such bridges X of the last named formula wherein the group

is linked directly to two elements having an atomic weight between 14 and 16, are

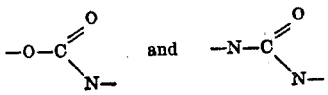

Such bridges exist in urethanes of the general formula

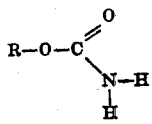

and in ureas of the general formula

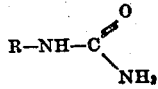

wherein R represents an organic radical having at least 13 carbon atoms.

In the above cited general formula

R—X—H

R represents quite generally an organic radical containing at least 13 carbon atoms. R may be for example a hydrocarbon radical belonging to the aliphatic, cycloaliphatic, mixed aliphatic-cycloaliphatic, aromatic, mixed aliphatic-aromatic or heterocyclic series. In contradistinction to aromatic hydrocarbons, aliphatic and cycloaliphatic hydrocarbon radicals contain generally no conjugated double bonds and can therefore be designated as being free from conjugated double bonds. The carbon chain of the radical R may also be interrupted once or repeatedly by heteroatoms, usch as O, S, N or by groups, such as

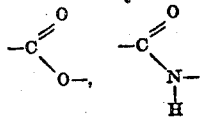

In the following are cited numerous examples of compounds of the general formula

R—X—H which further illustrate the significance of R.

Formaldehyde derivatives of compounds of the above cited general formula

R—X—H include for example methylol compounds of carboxylic acid amides, urethanes, ureas, further N-halogenmethyl derivatives of carboxylic acid amides such as N-halogenmethylcarboxylic acid amides and halogenmethylcarboxylic acid esters.

As carboxylic acid methylolamides there may be used, for example, the methylolamides of the following acids: myristic, palmitic, stearic, oleic, arachic, hardened whale oil fatty acids, resinic acids or naphthenic acids. Also methylol amides of aromatic carboxylic acid amides, substituted by alkyl residues in the nucleus or in a substituent, such as a hydroxy group. These N-methylolcarboxylic acid amides, insofar as they are not already known, are accessible by application of the known processes.

As methylol compounds of urethanes may be used, for example, N-methylol compounds obtainable in the usual manner from the urethanes corresponding with the fatty alcohols of high molecular weight.

The urea-methylol compounds which may be used in the invention may be made by known processes from ureas of high molecular weight, such as mono-hexadecyl urea.

As halogenmethylcarboxylic acid esters may be used for the invention, for instance the chloromethyl ester of myristic acid, palmitic acid or stearic acid. These chloromethyl esters, in so far as they have not been described, may be made by the known processes for making chloromethyl esters of fatty acids of low molecular weight or of chloracetic acid.

As N-chloromethylcarboxylic acid amides may be used those N-chloromethyl compounds which are easily obtainable in known manner from carboxylic acid amides of high molecular weight, for instance stearic acid amide, stearic acid N-methylamide, by means of formaldehyde (paraformaldehyde) and hydrogen halide. Thus the halogen methyl ethers of the formula

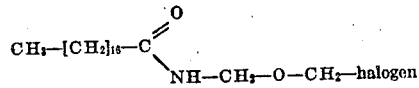

obtainable in known manner from 1 mol stearic acid amide and 2 mols formaldehyde, for example in the form of trioxymethylene, by introducing hydrogen halides, such as hydrogen chloride, into the benzene solution, may be used for the reaction with the thiourea. There also come into question as parent materials the chlormethyl derivatives obtainable from carboxylic acid methylolamides, for instance stearic acid methylolamide, or from hydroxamic acids, for instance stearyl hydroxamic acid

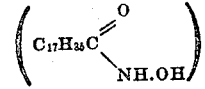

hydrazides, for instance stearic acid hydrazide

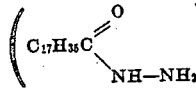

by means of trioxymethylene and hydrogen chloride. As is known the halogen methyl derivatives obtainable from carboxylic acid methylolamides with trioxy methylene and hydrogen halides, such as hydrogen chloride, contain the atom grouping

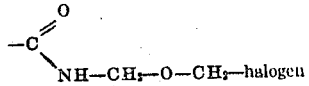

Thus the product of the formula

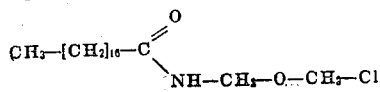

is obtained from stearic acid methylolamide in presence of hydrogen chloride.

As parent materials there come also into question the halogen methyl-imino-ethers of the formula

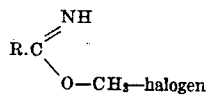

wherein R represents the radical of high molecular weight corresponding to the nitrile used, obtainable in known manner from the nitriles of high molecular weight, such as octa-decane-nitrile, with trioxymethylene and hydrogen halides, such as hydrogen chloride. The halogen methyl ethers of the general formula

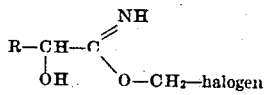

(wherein R=the radical of high molecular weight corresponding to the cyanogen hydrine used) obtainable in known manner from cyanogen hydrines with trioxymethylene and hydrogen halides, may also be used as parent materials. The reaction between the formaldehyde derivatives of the compounds of the cited general formula

and the thiourea compounds containing the group

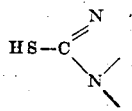

may be brought about by mixing the components at room temperature or at a raised temperature, for example 50–100° C., preferably in presence of a solvent, such as benzene, chloroform, carbon tetrachloride, or glacial acetic acid. In case methylol compounds like carboxylic acid N-methylolamides are used, it is frequently preferable to employ a strong acid, for instance hydrogen chloride, as a condensing agent and, if desired, a diluent such as alcohol. Particularly suitable is the use of alcoholic hydrochloric acid as condensing agent in the last named reaction.

According to the present process there are generally obtained salts of products of the general formula

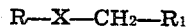

wherein R stands for an organic radical containing at least 13 carbon atoms and being free from water-solubilizing groups, X stands for a bridge consisting of the group

and of at least one and at the most two elements having an atomic weight between 14 and 16 directly connected with the group

and R₁ stands for the radical of a pseudo-thiourea compound, the methylene group —CH₂— being bound to the S-atom of the radical R₁ and to an element having an atomic weight between 14 and 16. As salts there come into consideration particularly the salts formed with mineral acids, such as hydrohalic acids, for example hydrochloric acid, hydrobromic acid, sulfuric acid, further the salts formed with organic acids, such as formic acid. An example of such a salt is the product of the formula

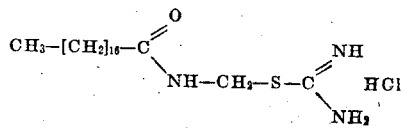

wherein the acid is bound by the pseudo-thiourea radical.

The condensation products obtainable by the invention when in the form of salts which they form with acids are soluble in water. The stability of the solutions thus obtained may be enhanced by certain additions, for example by addition of a thiourea, a urea, a capillary active product containing an active cation, for instance the acetate of oleylated unsymmetrical diethylene-diamine or the μ-heptadecyl-N-methyl-N'-ethyl-benzimidazolium chloride.

The products of the invention may be used among other purposes as assistants, for instance in the textile, leather and paper industries, for example as wetting, emulsifying, foam-producing, equalizing, softening agents or as agents enhancing the fastness of dyeings to water; also as disinfectants or preservatives.

Their especial interest lies in their property of affording water-soluble salts which may be decomposed by heat, particularly when heating the aqueous solution, or treatment with a saponifying agent, such as an alkali, for example sodium hydroxide, whereby insoluble bodies may be caused to separate. When this decomposition occurs on a substratum, for instance a textile, this insoluble body adheres firmly to the substratum. It may, according to its nature, impart to the fiber certain valuable properties. Among these are predominant the waterproofing or water-repelling property fast to washing with which, if desired, an especial softness and fullness may be connected, which latter properties may be enhanced by addition of separate filling agents. There may also be obtained a strong diminution of hydroscopic quality and an increase in thermal and electrical insulating properties. As further properties which may be imparted to the fiber may be named stability to creasing and to the shifting of the warp and weft, the diminution of luster, the increase in fastness to water, the diminution of shrinkage of the fabric, and, in the case of wool, the diminution of the felting capacity. By local application of the process calendering, matting and damask effects and color effects which have their origin in the changed affinity of the fiber for dyestuffs may be attained. When the process is applied to colored textiles, the properties of the colors, for instance fastness to light, to rubbing, to washing and to water, are essentially enhanced. These different effects may be additive.

If the parent materials used for the condensation are dyestuffs or intermediate products for dyestuffs, it is possible to bring the new products on to the fiber and to subject them to decomposition thereon, whereby the dyestuff or the intermediate product is fixed on the fiber and in the case of the intermediate product may be developed thereon.

The products of the invention may be used alone or together with other materials. for instance salts, especially salts of weak acids, for instance sodium acetate, ammonium acetate, aluminium formate, aluminium acetate or together with solvents or hydrocarbons, such as paraffin wax, or with products enhancing solubility, for instance urea, thiourea, ammonium sulfocyanide, also together with soaps, soap-like substances, protective colloids, dressing agents, such as methylol urea, loading agents, softening agents or matting agents.

The following examples illustrate the invention the parts being by weight, and the relationship between parts by weight and parts by volume is that which exists between the kilo and the litre:

Example 1

A hot solution of 30 parts of thiourea and 62 parts of stearic acid methylolamide is cooled while stirring to 50–55° C., whereby a portion is precipitated. There are then added by degrees 50 parts by volume of alcoholic hydrochloric acid of 25 per cent strength, a temperature of 55° C. not being exceeded. The product which separated at first now passes gradually into solution; after about 30 minutes reaction is finished, whereupon the solution is filtered, if necessary, and cooled. The product crystallizes in the form of colorless needles and when recrystallized from alcohol melts at 127–128° C. It has probably the formula

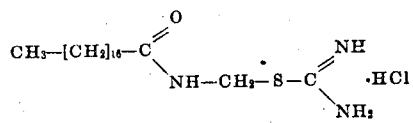

and is a snow white crystalline powder freely soluble in organic solvents, for instance alcohol, glacial acetic acid, dioxane or the like; in cold water it is sparingly soluble but in hot water forms an opalescent solution which foams strongly. When the aqueous solution is boiled or receives an addition of the alkali, the solution precipitates with the formation of a body completely insoluble in water.

The methylol compound obtainable in usual manner from hexadecyl urea

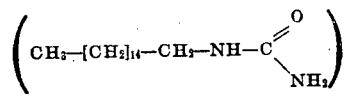

can be caused to react with thiourea in similar manner. Moreover the N-methylol-compounds obtainable in usual manner from abietic acid amide or from ortho-hexadecyloxy-benzoic acid amide may be condensed with thiourea.

Example 2

3.1 parts of oleic acid methylolamide and 1.5 parts of thiourea are dissolved in 20 parts by volume of alcohol and at 50–55° C. 2 parts of alcoholic hydrochloric acid of 25 per cent strength are added while stirring. After 20 minutes the alcohol is distilled in a vacuum and the condensation product which has probably the formula

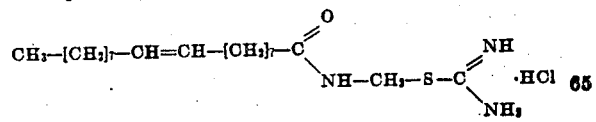

is left behind in the form of a semi-solid mass. This is soluble in hot water to a strongly foaming opalescent solution and otherwise behaves like the product of Example 1.

Example 3

14 parts of stearic acid methylolamide are added to a solution of 7.5 parts of thiourea in 100 parts of glacial acetic acid and the mixture is heated to 50–60° C. until it has become a clear solution. After about one hour's heating a sample is soluble in water with the exception of a slight turbidity. After distilling the glacial acetic acid in a vacuum at 50–60° C. there remains a condensation product which has probably the formula

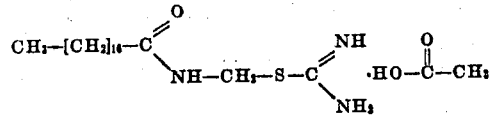

in the form of a white solid mass which has properties similar to those of the product of Example 1.

Example 4

14 parts of stearic acid amide, 2 parts of paraformaldehyde and 0.7 part of dimethylcyclohexylamine are heated together while stirring in the oil bath for 4 hours at 105–110° C. The clear melt is dissolved hot in 75 parts by volume of alcohol. To this solution of stearic acid methylolamide there is added 4.6 parts of thiourea and the whole is warmed until everything is dissolved. The solution is then cooled while stirring to 50° C., whereby a portion is crystallized. 9 parts by volume of alcoholic hydrochloric acid of 25 per cent strength are now added and the mass is heated while stirring for 30 minutes at 50–55° C. After a short time the precipitate redissolves with the exception of a slight turbidity. The end of the reaction is indicated when a sample of the alcoholic solution dissolves clearly while foaming in water at about 30° C. The hot solution is now filtered and cooled, whereby the condensation product of the probable formula

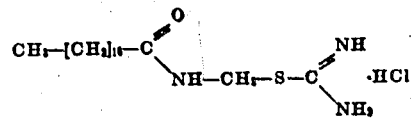

is crystallized. After filtration and drying in a vacuum the new product which is obtained in good yield is a white crystalline mass.

Example 5

150 parts of the amide from hardened whale oil acids are heated together while stirring with 7.5 parts of dimethylcyclohexylamine and 18 parts of para-formaldehyde for 4 hours at 105–110° C. The product is added to a solution of 46 parts of thiourea in 750 parts by volume of alcohol and the whole is heated until everything is dissolved. Cooling to 50° C. while stirring follows, whereby a portion is precipitated. 90 parts by volume of alcoholic hydrochloric acid of 25 per cent strength are now added and the mixture is further stirred at a temperature of 50–55° C. for one hour whereby the product first precipitated is gradually redissolved. After filtration from impurities and cooling, the condensation product which has probably the formula

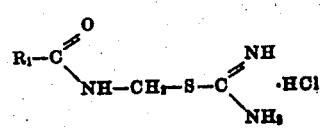

wherein $R_1$ stands for the aliphatic hydrocarbon radical contained in the hardened whale oil acid of the formula

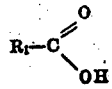

precipitates. It is filtered and dried at the ordinary temperature in a vacuum. Yield=164 parts.

The condensation product described above may be used as follows for making fabrics water-repellent in a manner which is fast to washing. 10 parts of the condensation product are dissolved at 70° C. in 30-50 parts by volume of alcohol, and water at 45° C. is added, and the whole is made up with cold water to 1000 parts by volume and then 3 parts of sodium acetate are added. Cotton fabric is drawn through this liquor at 30° C. for about 20 minutes, then squeezed and dried at about 75–100° C. After this treatment the fabric is water-repellent and this property is not affected by intense washing (5 grams of soap per litre, duration of washing 20 minutes at 90° C.) or by treatment with dry cleaning agents, such as carbon tetrachloride. In similar manner a fabric made from viscose artificial silk can be made water-repellent and soft.

Example 6

3.1 parts of methylol stearic acid amide are dissolved hot in 25 parts by volume of absolute alcohol. After cooling to 45–50° C. 3 parts of finely powdered N:N'-diethylthiourea are added and 2 parts by volume of alcoholic hydrochloric acid of 20 per cent strength are dropped in while stirring at 45–50° C. The solution is further stirred for 15 minutes at 45–50° C. and the alcohol is distilled in a vacuum at about 40° C. (temperature of water bath). The condensation product is thus obtained in the form of a colorless viscid oil which solidifies in the cold to a waxy mass. It has probably the formula

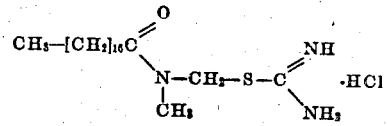

It is soluble in water to a clear solution which foams strongly and is completely decomposed by heating it for a short time.

The N-monoethylthiourea behaves similarly.

Example 7

3.1 parts of methylolstearic acid amide are dissolved hot in absolute alcohol. At about 40° C. 4 parts of finely powdered N-phenylthiourea and 2 parts by volume of alcoholic hydrochloric acid of 20 per cent strength are added. After stirring for 10 minutes at 40–45° C. a sample of the solution remains clear when diluted with water. When this is the case the alcohol is distilled in a vacuum, the new product which corresponds probably to one of the two formulas

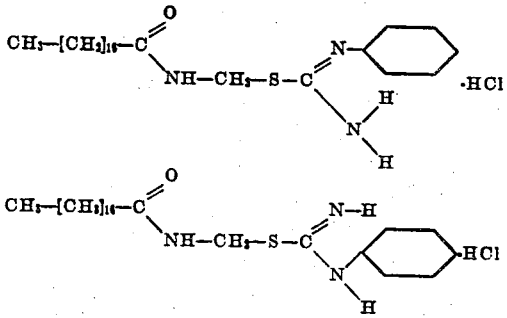

being left in the form of a colorless waxy mass.

A sample dissolved in a little alcohol remains a clear solution on dilution with water. The solution foams and becomes turbid when heated for a short time, whereby the tendency to foam is lost.

Example 8

3.4 parts of N-chloromethyl-N-methylstearic acid amide are dissolved hot in 10 parts by volume of acetone. While cooling with ice the solution is gradually run into a solution of 1 part of thiourea in 10 parts by volume of acetone. When all has been introduced, the whole is heated while stirring for 30 minutes at 40° C. and then cooled with ice water. The condensation product of the formula

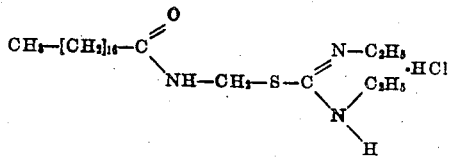

which has separated in the meantime in the form of a white granular mass is then separated by filtration. A simple dissolved in a little alcohol yields on addition of water a feebly opal solution which foams and is rapidly decomposed by heat.

The formaldehyde derivative obtainable in known manner from stearic acid amide, trioxymethylene and hydrogen chloride can be caused to react with thiourea in analogous manner.

Example 9

1.6 parts of stearic acid methylolamide are dissolved hot in 20 parts by volume of glacial acetic acid. At 40–45° C. there is added a solution of 1.8 parts of potassium N-phenyl-thiourea-para-sulfonate in 3 parts by volume of water. While stirring at 40–45° C. 2 parts by volume of alcoholic hydrochloric acid of 20 per cent strength are added by drops. After further stirring for 30 minutes at the same temperature a sample dissolves in water to a clear solution. The new product which has been precipitated by addition of ether and isolated by filtration forms a semi-solid white mass freely soluble in water.

Example 10

6.8 parts of thiourea are dissolved in 90 parts of glacial acetic acid and the solution is allowed to cool to 60° C. and at 40–60° C. there is added a mixture of 25 parts of stearic acid chloromethyl ester and 10 parts of glacial acetic acid in the course of about half an hour. After stirring for a further ½ hour at 50–55° C. the mass is allowed to cool and after long standing the precipitated product is separated from the liquor. This new condensation product which has probably the formula

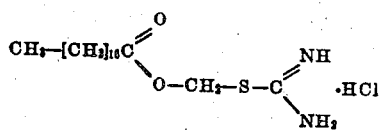

is, after drying, an approximately colorless powder which dissolved in hot water to a solution that foams when shaken. The aqueous solution is gradually decomposed when boiled.

To make the stearic acid chloromethyl ester 1000 parts of stearic acid chloride are stirred with 100 parts of para-formaldehyde and 17 parts of powdered anhydrous zinc chloride at room temperature and after the temperature produced by the reaction has begun to fall the mass is heated for 2 hours in a boiling water bath. When cooled the stearic acid chloromethyl ester thus obtained solidifies to a mass which is decomposed by boiling water.

The stearic acid bromomethyl ester obtainable in similar manner like the stearic acid chloromethyl ester, can be caused to react with thiourea in the same manner.

Instead of with thiourea, the stearic acid halogen methyl esters, such as stearic acid chloromethyl ester, can also be condensed with N:N'-diethylthiourea.

The condensation product obtained from thiourea and stearic acid chloromethyl ester may be used, for example, in the following manner for producing permanent hydrophobe character in the fabric.

10 parts of the condensation product are dissolved in 100 parts of ethyl alcohol and the solution is run into 1000 parts of water at 75° C. containing 2.5 parts of ammonium sulfocyanide and 5 parts by volume of concentrated formic acid. A cotton fabric is drawn through this liquor at 50° C. during about 20 minutes. After squeezing the still wet fabric is drawn through a solution of ammonium acetate of 2 per cent strength at 50° C. during about 1 minute; it is again squeezed and dried at about 50° C. The stability to washing of this hydrophobe fabric may be improved by an after-treatment of the fabric by heat, for example at a temperature of 140° C. for about 4 minutes. In similar manner viscose artificial silk may be made soft and water-repellent.

*Example 11*

100 parts of stearic acid chloromethyl ester and 500 parts of glacial acetic acid are warmed together at 50° C.; there are then added while stirring 272 parts of finely powdered thiourea in the course of about 30 minutes at 50–55° C. and the whole is stirred for ¾ hour at 80–85° C. The mass which gradually thickens becomes solid when cold. The condensation product may be purified by extraction with petroleum ether and if desired with cold water; it then has properties similar to those of the product obtained in Example 10.

The palmitic acid chloromethyl ester obtainable by an analogous process can also be caused to react with thiourea in analogous manner.

What we claim is:

1. A process for the manufacture of condensation products which comprises condensing, in the presence of an acid, a thiourea compound of the formula

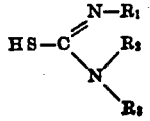

wherein $R_1$, $R_2$ and $R_3$ represent a member of the group consisting of hydrogen, alkyl, aryl and aralkyl radicals, with a compound containing at least 14 carbon atoms and selected from the group consisting of methylol compounds of carboxylic acid amides and urethanes.

2. A process for the manufacture of condensation products which comprises condensing, in the presence of an acid, a thiourea compound of the formula

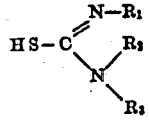

wherein $R_1$, $R_2$ and $R_3$ represent a member of the group consisting of hydrogen, alkyl, aryl and aralkyl radicals, with a urea containing at least 14 carbon atoms.

3. Process for the manufacture of condensation products, which comprises condensing a thiourea compound of the formula

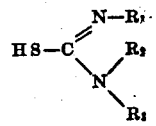

wherein $R_1$, $R_2$ and $R_3$ represent a member of the group consisting of hydrogen, alkyl, aryl and aralkyl radicals with a methylol derivative of a compound of the general formula

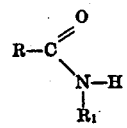

wherein R stands for an aliphatic hydrocarbon radical containing at least 13 carbon atoms and $R_1$ stands for a member of the group consisting of hydrogen and alkyl in the presence of an acid.

4. Process for the manufacture of condensation products, which comprises condensing a thiourea compound of the formula

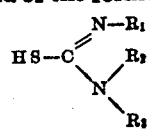

wherein $R_1$, $R_2$ and $R_3$ represent a member of the group consisting of hydrogen, alkyl, aryl and aralkyl radicals with a formaldehyde derivative of the formula

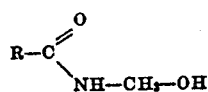

wherein R stands for an aliphatic hydrocarbon radical containing at least 13 carbon atoms in the presence of an acid.

5. Process for the manufacture of condensation products, which comprises condensing a thiourea compound of the formula

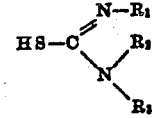

wherein $R_1$, $R_2$ and $R_3$ represent a member of the group consisting of hydrogen, alkyl, aryl and aralkyl radicals with a formaldehyde derivative of the formula

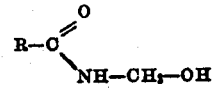

wherein R stands for an aliphatic hydrocarbon radical containing at least 13 carbon atoms the said reaction being conducted in the presence of an acid and of a diluent.

6. Process for the manufacture of condensation products, which comprises condensing thiourea with a formaldehyde derivative of the formula

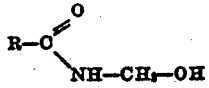

wherein R stands for an aliphatic hydrocarbon radical containing at least 13 carbon atoms in the presence of an acid and of a diluent.

7. Process for the manufacture of condensation products, which comprises condensing thiourea with the formaldehyde derivative of the formula

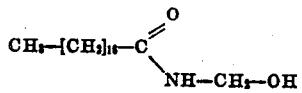

in the presence of an acid and of a diluent.

8. Process for the manufacture of condensation products, which comprises condensing thiourea with the N-methylolamide of hardened fish oil fatty acid in the presence of an acid and of a diluent.

CHARLES GRAENACHER.
RICHARD SALLMANN.
OTTO ALBRECHT.